US010582232B1

(12) United States Patent
Rundle et al.

(10) Patent No.: US 10,582,232 B1
(45) Date of Patent: Mar. 3, 2020

(54) TRANSCODING FRAME-SYNCHRONOUS METADATA FOR SEGMENTED VIDEO DELIVERY

(71) Applicant: Amazon Technologies, Inc., Seattle, WA (US)

(72) Inventors: Brian J. Rundle, Portland, OR (US); Matthew Carter, Alexandria, KY (US); Kevin Moore, Portland, OR (US); Alan Spain, Portland, OR (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/177,264

(22) Filed: Oct. 31, 2018

(51) Int. Cl.
*H04N 7/173* (2011.01)
*H04N 21/2343* (2011.01)
*H04N 21/236* (2011.01)
*H04N 21/643* (2011.01)
*H04N 21/472* (2011.01)
*H04N 21/434* (2011.01)

(52) U.S. Cl.
CPC ... *H04N 21/234336* (2013.01); *H04N 21/236* (2013.01); *H04N 21/434* (2013.01); *H04N 21/472* (2013.01); *H04N 21/643* (2013.01)

(58) Field of Classification Search
CPC ......... H04N 21/234336; H04N 21/236; H04N 21/434; H04N 21/472; H04N 21/643
See application file for complete search history.

(56) References Cited

U.S. PATENT DOCUMENTS

| 2014/0129618 | A1* | 5/2014 | Panje | H04N 21/26258 709/203 |
| 2014/0130115 | A1* | 5/2014 | Losev | H04L 65/607 725/116 |
| 2014/0143439 | A1* | 5/2014 | Ramamurthy | H04N 21/23439 709/231 |
| 2014/0177700 | A1* | 6/2014 | Schmidt | H04N 19/40 375/240.01 |
| 2015/0281746 | A1* | 10/2015 | Lam | H04N 21/2368 725/116 |

* cited by examiner

*Primary Examiner* — Mulugeta Mengesha
(74) *Attorney, Agent, or Firm* — Nicholson De Vos Webster & Elliott, LLP

(57) ABSTRACT

Techniques for transcoding a video with frame-synchronous metadata are described. A portion of a digital video transmission is obtained, the portion including a first sequence of video frames, a plurality of metadata values, and a first set of timing data relating the plurality of metadata values to the first sequence of video frames. A rendition of the first sequence of video frames is encoded, the rendition including a second sequence of video frames based on the first sequence of video frames. A plurality of segment files for the rendition is generated, each segment file including a group of frames from the second sequence of video frames and a group of metadata values, each metadata value in the group of metadata values having a correspondence to a frame in the group of frames based on the first set of timing data.

20 Claims, 7 Drawing Sheets

US 10,582,232 B1

TRANSCODING FRAME-SYNCHRONOUS METADATA FOR SEGMENTED VIDEO DELIVERY

BACKGROUND

Many existing full-motion video (FMV) systems base video encapsulation and delivery on techniques developed by the commercial broadcast industry for delivery over well-architected networks such as terrestrial broadcast networks or IP television (IPTV) networks. One such technique involves packaging of video, audio, and metadata in an MPEG-2 transport stream, encapsulating the transport stream in user datagram protocol (UDP) packets for delivery over an Internet Protocol (IP) based network, and transmitting the encapsulated stream as a real-time continuous data stream using either unicast or multicast IP delivery. Since UDP packets are delivered to the viewing clients asynchronously with no acknowledgement of delivery, such a delivery technique works well over well-architected networks. As IP-based networks have evolved, newer services and standards have been developed for video delivery of media over-the-top (OTT) of less-well characterized networks, such as the Internet, as opposed to networks optimized for FMV delivery. Many of these services and standards abandon UDP-based transport of MPEG-2 transport streams in favor of formats with lower bandwidth requirements (e.g., for clients consuming OTT media via a wireless connection) or even adaptive bandwidth requirements (e.g., for clients receiving OTT media via congested portions of a network).

BRIEF DESCRIPTION OF DRAWINGS

Various embodiments in accordance with the present disclosure will be described with reference to the drawings.

DETAILED DESCRIPTION

Various embodiments of methods, apparatus, systems, and non-transitory computer-readable storage media for transcoding video with frame-synchronous metadata for over-the-top (OTT) network delivery are described. According to some embodiments, a transcoder converts full-motion video (FMV) from a media source in a first transport format to a second transport format. The first transport format includes the FMV and frame-synchronous metadata. In converting between the transport formats, the transcoder preserves the relation between the metadata and frames of the FMV in the second transport format for OTT network delivery. For example, the transcoder converts an MPEG-2 transport stream received via UDP-based delivery into an ISO base media file format (ISOBMFF, as defined in ISO/IEC 14496-12) for segmented delivery via Hypertext Transfer Protocol (HTTP) using adaptive bitrate streaming techniques such as the Motion Picture Expert Group (MPEG) Dynamic Adaptive Streaming over HTTP (MPEG-DASH) or HTTP Live Streaming (HLS). The transcoder packages the frame-synchronous metadata so that its relation to frames in the video can be reconstructed during playback by a client device.

Unlike subtitles or closed captions, frame-synchronous metadata contains information about specific frames of video as opposed to segments of video. Exemplary frame-synchronous metadata includes information about a frame such as the camera or platform that captured the frame (e.g., ground or air-based surveillance platform, platform identifier, sensor type, etc.), when or where the frame was captured (e.g., UTC-time, geospatial location of the camera, the geospatial coverage of the camera field-of-view, etc.), the environment of the camera or platform when the frame was captured (e.g., temperature, humidity), and other information. A playback device can render information based on the frame-synchronous metadata during playback, such as by displaying geospatial coordinates, overlaying a map on the video, fusing video with other imagery in augmented reality, etc. To ensure the accuracy of such client-applications, the present disclosure details the preservation of frame-synchronous metadata during transcoding for OTT FMV delivery. Frame-synchronous metadata is packaged and transmitted such that a video playback device can associate metadata with individual frames in a video sequence. Thus, in some embodiments, a video playback device can render, output, or otherwise make available the frame-synchronous metadata or other information derived from the frame-synchronous metadata during at least a portion of the period during which the frame is displayed.

Figure 1:
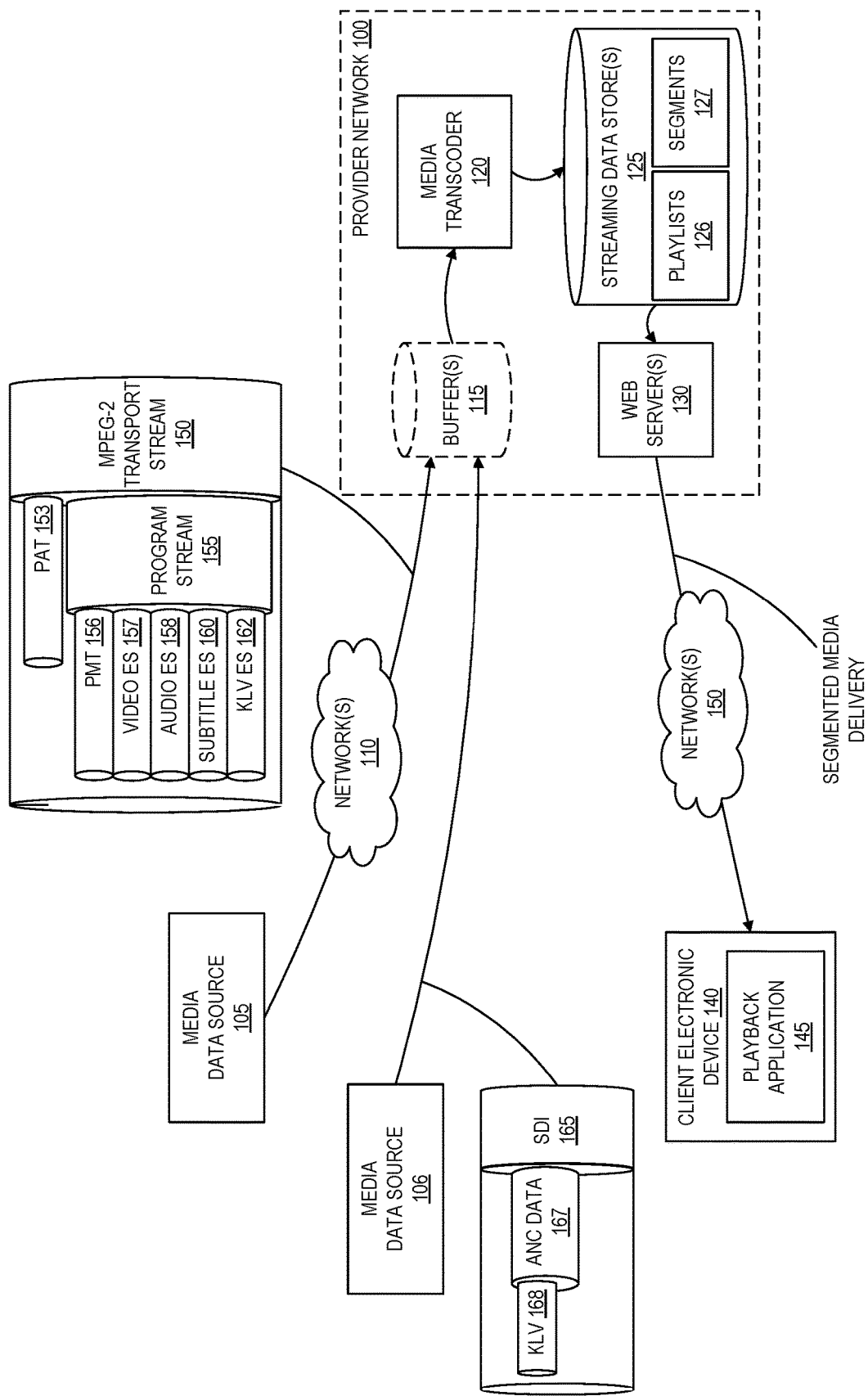
FIG. 1 is a diagram illustrating an environment for transcoding video with frame-synchronous metadata for segmented delivery according to some embodiments.

FIG. 1 is a diagram illustrating an environment for transcoding video with frame-aligned metadata for segmented delivery according to some embodiments. As shown, the environment includes a media transcoder 120, one or more streaming data stores 125, and a web server 130. The media transcoder receives media data from a media data source, such as media data source 105 and/or media data source 106. In some embodiments, the media data is buffered in one or more buffers 115 prior to transcoding. In some embodiments, the media transcoder 120, the streaming data store(s) 125, the web server 130, and the optional buffer(s) 115 are part of a provider network 100 that provides web-based media transcoding, hosting, and distribution services.

If present, the media data source 105 transmits media data to the provider network 100 via one or more networks 110. In some embodiments, the transmission is a UDP-based transmission over an IP-based network, such as the internet. In some embodiments, the transmission is an MPEG-2 transport stream 150. An MPEG-2 transport stream is a multiplexed data stream of one or more program streams, where each program streams has one or more elementary streams such as audio, video, etc. As part of the multiplexed data stream, the MPEG-2 transport stream includes a program association table (PAT) 153 that includes information about the program streams included within the MPEG-2 transport stream 150, such as a program stream 155. In some embodiments, the program stream 155 includes a program map table (PMT) 156 that includes identifying information of the elementary streams included within the program stream 155. The program stream 155 includes a video elementary stream 157 and a metadata elementary stream 162. The program stream 155 may further include an audio elementary stream 158 and/or a subtitle or captions elementary stream 160. In the illustrated example, the metadata elementary stream 162 includes key-length-value (KLV) data as defined under the Society of Motion Picture and Television Engineers (SMPTE) ST 336M standard. Each KLV data "triplet" corresponds to a frame in the video elementary stream 158.

To facilitate synchronization of the video elementary stream 157, the metadata elementary stream 162, and any other available streams that are part of the program stream 155, the program stream 155 includes a clock reference (CR) and the multiplexed components of the program stream (video, metadata, audio, etc.) include timing information to indicate when the component should be rendered to the user. The CR can be used to initialize and synchronize the decoders of the various elementary streams to their encoded rate, and the timing information can be used by the decoders to ensure that each decoder renders output (e.g., display of video, playback of audio, display of metadata or visual information based on metadata, etc.) in time with other decoders (e.g., displaying metadata associated with a frame at the same time the frame is displayed).

If present, the media data source 106 transmits media as a serial digital interface (SDI) transmission 165. Frames in an SDI packet are demarcated with synchronization packets. The SDI transmission 165 includes ancillary data 167, and the ancillary data 165 includes metadata 168, such as KLV data, and may further include audio data (not shown). The ancillary data 167 may be present during horizontal or vertical blanking periods of the video transmission. In an exemplary embodiment, the metadata 168 includes one or more KLV triplets transmitted during the vertical blanking period associated with a frame in the SDI transmission thereby associating the one or more KLV triplets with a particular frame.

In some embodiments, media data sources 105, 106 are part of or coupled to the provider network 100 without any intermediate networks. Further, although described as sourcing MPEG-2 transport streams and SDI transmissions, other media data sources may transmit video and frame-synchronous metadata using other transmission standards.

At a high level, the media transcoder 120 obtains media data from the media data source 105 or media data source 106, optionally by way of the buffer(s) 115. The media transcoder 120 converts the media from the original format to a format for segmented delivery. Exemplary segmented delivery techniques include MPEG-DASH and HLS. Segmented delivery differs from the received media format (e.g., as an MPEG-2 transport stream or SDI transmission) in several ways. First, segmented delivery systems rely on the Transmission Control Protocol (TCP) for guaranteed packet delivery through a series of negotiations between receiver and sender, increasing the overall quality of experience and reliability for the viewer. Second, segmented delivery systems work by temporally encoding portions of a media presentation into short segments or files to be played sequentially. Based on a manifest or playlist that identifies these segments, a client (e.g., a web browser) can sequentially request segments via HTTP. As segments are being requested and transmitted, the client plays back previously received segments to provide a continuous playback experience.

For example, the media transcoder 120 may obtain a one minute long multimedia presentation from the media data source 105 or the media data source 106, the multimedia presentation including audio, video, and frame-synchronous metadata. The media transcoder 120 encodes the video portion of the media stream into a plurality of renditions for a different client environment (e.g., high- vs. low-speed connections, varying screen sizes, etc.). If segmented into 5-second intervals, each rendition includes twelve segments. Note that the segmentation may be based on an upper limit on segment file-size rather than a fixed duration (e.g., 1 megabyte of information which may correspond to 3 seconds of video or 10 seconds of video, depending, for example, on the compression ratio of that segment of video). The media transcoder 120 may similarly encode the audio into a plurality of renditions for different client environments (e.g., stereo, surround sound, etc.). The media transcoder 120 may segment the audio and/or frame-synchronous metadata into 5-second segments, some other duration segments, or into a single 60-second long file per rendition given that the relative size of the frame-synchronous metadata for the entire media presentation may be a fraction of the size of a segment of encoded video. During segmentation, the media transcoder 120 preserves the association of the frame-synchronous metadata with individual frames in the video data. For example, an MPEG-2 transport stream might include a video elementary stream that decodes into a frame displayed roughly once every 33.3 milliseconds (ms) and a metadata elementary stream. The clock references and timing information in the MPEG-2 transport stream might associated three metadata values in the metadata elementary stream with the third frame in the video elementary stream, the third frame displayed between 66.6 ms and 99.9 ms in the video. Post-segmentation, the segment files include timing information to cause a playback application to render three metadata values (or indications or representations thereof) with the frame rendered between 66.6 ms and 99.9 ms in the segmented multimedia presentation.

In an exemplary transcoding of an MPEG-2 transport stream for segmented delivery, the media transcoder 120 reads the PAT 153 to identify a program stream of interest (e.g., if multiple program streams are present) and its constituent elementary streams (e.g., video, frame-synchronous metadata, etc.). Based on the identification of the elementary streams, the media transcoder 120 reads the identified elementary streams, including clock references and timing information, and may store data from each in temporary data structures during the transcoding process.

In some embodiments, the media transcoder 120 converts the data in the elementary streams from one encoding format to another encoding format. For example, the video elementary stream may include video data encoded according to the H.262 video encoding standard, or the audio elementary stream may include audio data encoded according to the ISO/IEC 11172-3 standard. To facilitate distribution of video in varying formats (e.g., for different screen resolutions, different bandwidth allotments, etc.), the media transcoder 120 decodes the encoded elementary stream and encodes the raw data in the same or a different format (e.g., H.263, H.264, AAC, AC-x, FLAC, etc.). For example, the media transcoder 120 may apply an encoding algorithm that increases the compression (thereby reducing the bandwidth requirement) of the data in the video elementary stream.

Once the media transcoder 120 has extracted data from the elementary data streams (and, optionally, transcoded the data into other formats), the media transcoder 120 packages the data for segmented delivery, preserving the association between metadata and its associated frame. Note that not all frames may have associated metadata, but each block of metadata in the frame-synchronous metadata has an associated frame. In packaging the data for segmented delivery, the media transcoder 120 generates groups of segment files 127 (sometimes referred to as fragment files). In some embodiments, each segment file is a container, and each container can include containers. Continuing the earlier example with a one minute long multimedia presentation, the media transcoder 120 may generate six renditions of the video portion of the presentation (e.g., for high and low-bandwidth versions for screen resolutions of 568×320, 1280×800, and 1920×1080), and two renditions of the audio portion of the presentation (e.g., stereo and AC-3). Each rendition includes one or more segments, or files. Playback of the one or more segments in sequence plays back at least a portion of the media presentation (e.g., if the group of segment files contains only video information, playback of the group of files plays back video).

In addition to generating the segments, the media transcoder generates one or more playlist files 126 (sometimes referred to as manifest files). The playlist files identify segment files containing renditions of the media presentation and further include characteristics about the renditions (e.g., resolution, audio encoding format). For example, a playlist file may identify several video renditions encoded for different resolutions or connection speeds, the resolution or speed characteristics of each rendition, and a single audio rendition.

In an exemplary transcoding of an SDI transmission for segmented delivery, the media transcoder 120 synchronizes frames based on synchronization packets contained in the SDI transmission and constructs a sequence of uncompressed video frames which may be stored in a temporary data structure. For frames that include frame-synchronous metadata in the ancillary data, the media transcoder 120 stores the metadata associated with each frame, maintaining the correspondence between the metadata in the frame's ancillary data and the frame itself. In embodiments where the SDI transmission includes audio information in the ancillary data, the media transcoder 120 may store the audio information, preserving its timing relation relative to the video frames.

Since SDI video transmissions are typically uncompressed, the media transcoder 120 may encode the video data into one or more formats as described above to facilitate the distribution of the video in varying formats. The media transcoder 120 may further change the encoding of the audio data (if present). The media transcoder 120 packages the data extracted from the SDI transmission for segmented delivery as segment files 127 and playlist files 126, as described above.

Whether originating from an MPEG-2 transport stream, SDI transmission, or some other video source, the frame-synchronous metadata may be packaged with the video renditions or be packaged as a separate rendition, as described in greater detail below with reference to FIGS. 2 and 3.

In some embodiments, the media transcoder 120 changes the format of the frame-synchronous metadata. For example, if the frame-synchronous metadata is received as a KLV triplet, the media transcoder 120 may read the KLV data and convert it to a JavaScript Object Notation (JSON) or eXtensible Markup Language (XML) format (or vice versa). The media transcoder 120 may generate one or more renditions of the frame-synchronous metadata, each rendition having a different format.

In some embodiments, the media transcoder 120 changes values of data within the frame-synchronous metadata. In some embodiments, for example, the value in a KLV triplet is composed of nested KLV triplets. That is, a KLV triplet identified by key A (and associated with a frame) may have a value composed of KLV triplets with keys A1, A2, and A3. In some embodiments, the media transcoder may change the value associated with key A1, modify the length associated with key A1 (assuming the change in the value changed the length of KLV triplet A1), and update the length of KLV triplet A. In some embodiments, the media transcoder may add a new KLV triplet A4 to the KLV triplet A and update the length of KLV triplet A.

The generated segment files 127 and playlist files 126 are stored in one or more streaming data stores 125.

To play a segmented media presentation, a client electronic device 140 communicates with a web server 130 to obtain segment files 127 based on a playlist file 126. For example, a playback application 145, such as a web browser or video player, executing on the client electronic device 140 may obtain a playlist file 126 by requesting the playlist file 126 from the web server 130 or via another delivery mechanism (e.g., as an attachment to an email, from a shared cloud-based storage drive, an FTP server, etc.). Continuing the above example, the playlist file may identify six renditions of the video portion of the minute-long presentation (e.g., for high and low-bandwidth versions for screen resolutions of 568×320, 1280×800, and 1920×1080) and two renditions of the audio portion of the presentation (e.g., stereo and AC-3). Note that in some embodiments, the playlist file may identify the segments of each rendition directly or identify another playlist file associated with the rendition that identifies the segments. In the latter case, the playback application 145 obtains the other playlist file(s).

Based on the rendition characteristics in the playlist file, the playback application 145 selects one or more renditions for presentation playback. For example, the playback application 145 may select the high-bandwidth version of the 568×320 resolution video rendition based on the screen size and connection speed of the client electronic device 140 and select the stereo audio rendition. As indicated above, the frame-synchronous metadata may be stored in one or more renditions that are separate from the video renditions or included within the video renditions, as described in further detail below with respect to FIGS. 2 and 3. In the former case, the playback application 145 also selects the frame-synchronous metadata rendition.

The playback application 145 sends a request for the first segment of each of the selected renditions to the web server 130. In response to the request, the web server 130 obtains the requested segments from the streaming data store(s) 125 and sends the segments to the client electronic device 140. Using the received segments, the playback application 145 renders the video, audio, and frame-synchronous metadata to a viewer, synchronizing the video and frame-synchronous metadata based on timing information included in the segment(s). For example, if the frame-synchronous metadata includes geospatial information, the playback application 145 may render the video on a display of the client electronic device 140 and overlay a portion of a map based on the geospatial information on the video. The playback application 145 aligns the periods during which it renders frames of the video and the associated frame-synchronous metadata based on the timing information.

Due to the segmented delivery of the media presentation, the playback application 140 may monitor the amount of the presentation data received from the web server 130 and queued for playback in one or more data buffers. During playback, if the amount of presentation data drops below a threshold, the playback application 140 may request a next segment of a different rendition (e.g., the low-bandwidth version of the 568×320 resolution video) from the web server 130 to avoid interruptions in the playback experience to the viewer.

Figure 2:
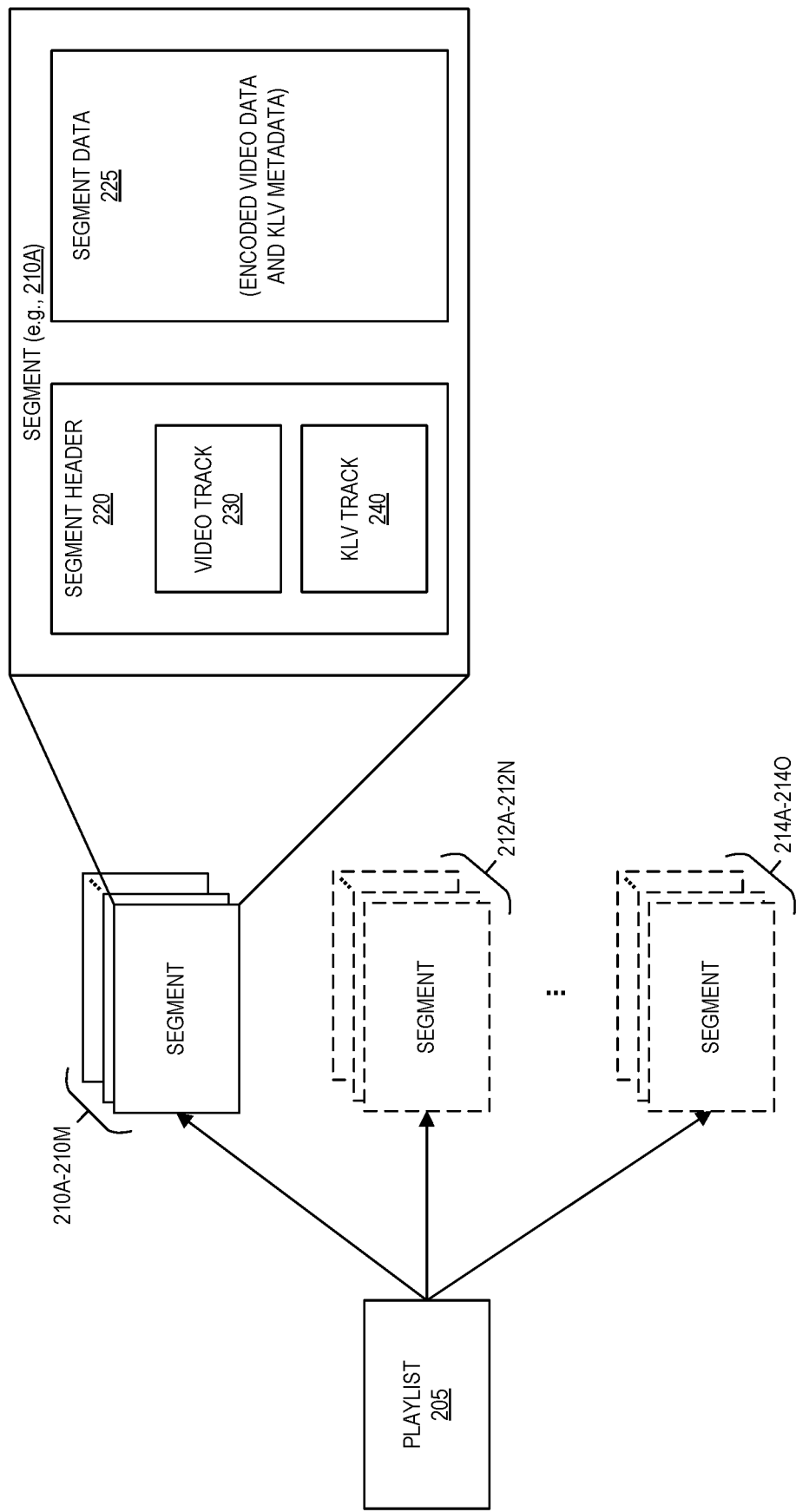
FIG. 2 is a diagram illustrating a set of transcoding output files for segmented delivery according to some embodiments.

FIG. 2 is a diagram illustrating a set of transcoding output files for segmented delivery according to some embodiments. A playlist 205 identifies one or more groups of segments, such as segments 210A-210M, 212A-212N, and 214A-214O. In some embodiments, segments include a header portion and a data portion, such as those segments formatted based on the ISOBMFF. Each segment may contain one or more tracks associated with media components of the presentation, such as an audio track, video track, metadata track, and/or subtitle track. A group of such segments make up a rendition of the associated media contained therein. For example, a group of segments containing only a video track may make up a video rendition of a presentation. In a one-minute long video at 30 fps, the 1,800 frames of video may be divided into the segments such that a first segment includes the first 100 frames, the second segment includes the next 100 frames, the third segment includes 50 frames, etc. Played in sequence, the segments form the media presentation for a given rendition of the media components contained therein.

In the embodiment illustrated in FIG. 2, frame-synchronous metadata, such as KLV data, is "welded" to the video data by including both the frame-synchronous metadata track and the video track in the same segment file. In particular, a segment header 220 of a segment file includes a video track 230 and a KLV track 240, and a segment data 225 portion of the segment file includes video frames and associated frame-synchronous metadata. In some embodiments, the segment header 220 is an ISOBMFF moof container, and the segment data 225 is an ISOBMFF mdat container. The video track 230 and the KLV track 240 include a list or table of samples respectively identifying the frames and the corresponding frame-synchronous metadata values contained in the segment data 225. For example, the media transcoder 120 may divide a video into a first segment including frames 0-50, a second segment including frames 51-115, and a third segment including frames 116-200, and generate a video track for each segment identifying the frames contained therein. Based on the timing information received from the media data source that transmitted the video, the media transcoder 120 also identifies the frame-synchronous metadata values that correspond to the frames included in each segment. Thus, if each frame has an associated metadata value, the media transcoder 120 divides the metadata values such that metadata values corresponding to frames 0-50 are included within the first segment, metadata values corresponding to frames 51-115 are included within the second segment, and metadata values corresponding to frames 116-200 are included in the third segment. The media transcoder 120 generates frame-synchronous metadata tracks to include in the segment headers of the first, second, and third segments to identify the metadata values contained therein. Additional information related to these track structures is described with reference to FIG. 4.

Figure 3:
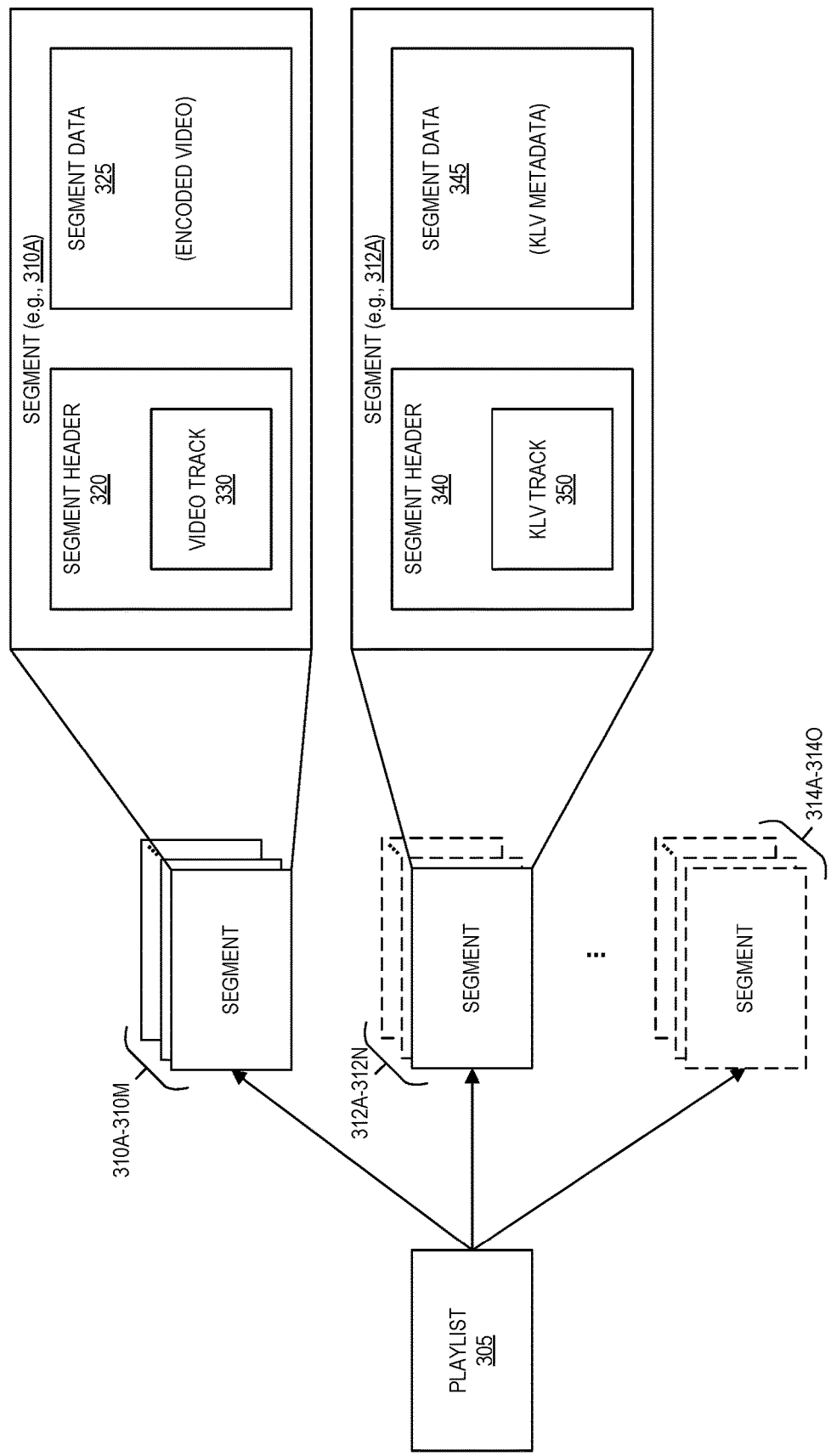
FIG. 3 is a diagram illustrating another set of transcoding output files for segmented delivery according to some embodiments.

FIG. 3 is a diagram illustrating another set of transcoding output files for segmented delivery according to some embodiments. A playlist 305 identifies at least two groups of segments, such as segments 310A-310M, 312A-312N, and 314A-314O. Segments are containers as described above with reference to FIG. 2. Again, the media transcoder 120 may segment a video into a group of segments 310 (e.g., frames 0-119 in a first segment, frames 120-300 in a second segment, etc.). In the embodiment illustrated in FIG. 2, frame-synchronous metadata, such as KLV data, is stored separately from video data. As illustrated, the group of segments 310 includes a video rendition, while one or more segments 312 includes a frame-synchronous metadata rendition. A segment of the video rendition includes a segment header 320 that includes a video track 330 and segment data 325 that includes frames of video, again the video track 330 providing identifying information of the frames of video. A segment of the frame-synchronous KLV rendition includes a segment header 340 that includes a track 350 for the KLV data and segment data 345 that includes the KLV triplets identified in the track 350. By separating the frame-synchronous metadata from the video data, the media transcoder 120 avoids creating a separate rendition for each combination of distinct video rendition (e.g., for different screen sizes, connection speeds) and frame-synchronous metadata rendition (e.g., for KLV triplets, JSON metadata, XML metadata, etc.). Note that the segmentation of frame-synchronous metadata need not align with the segmentation of video frames. The timing information contained in the header 350 allows a playback application (e.g., playback application 145) to associate individual frame-synchronous metadata values with individual frames. In some cases, the size of the frame-synchronous metadata may be relatively small and fit in a single file rather than a segmented group of files.

Figure 4:
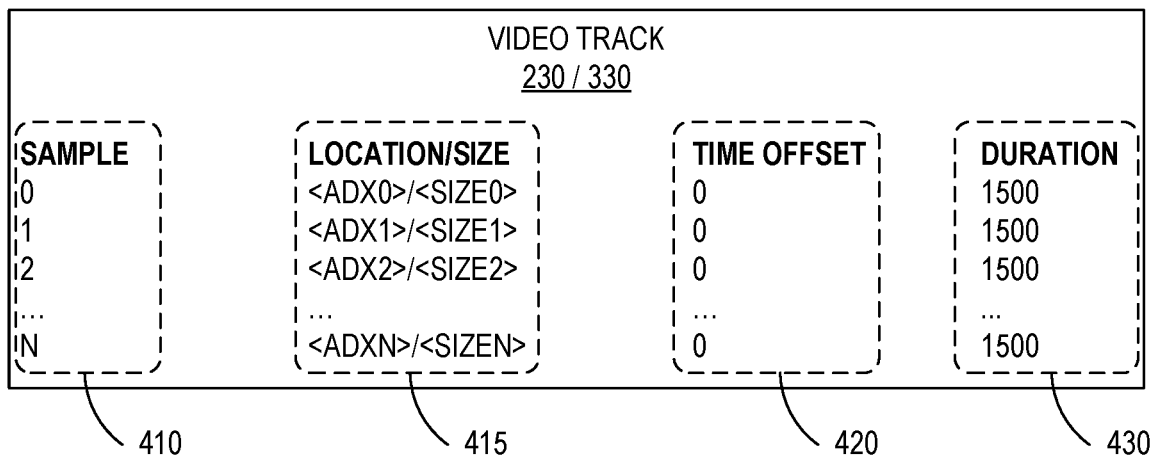
FIG. 4 is a diagram illustrating an exemplary set of data structures for synchronizing frame-synchronous metadata and video frames according to some embodiments.
Figure 4:
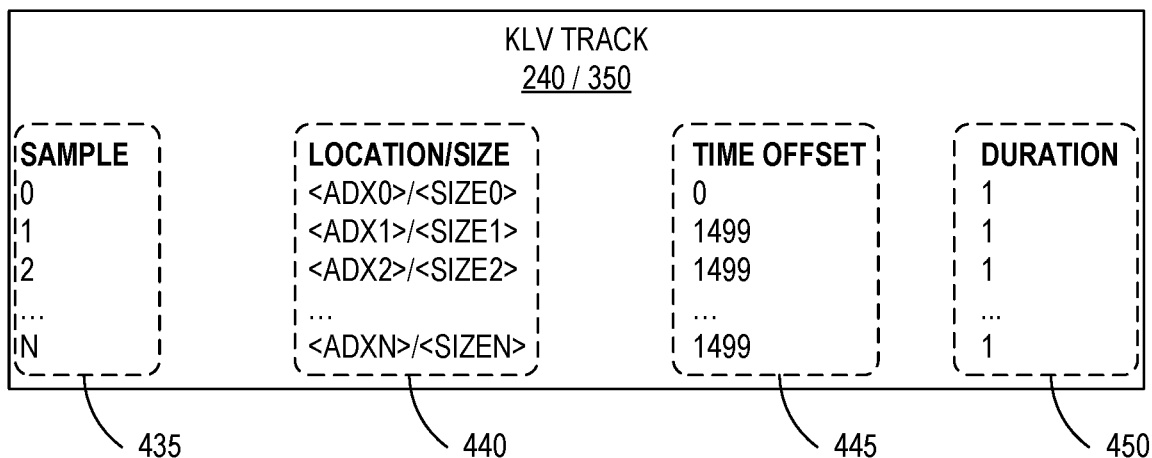

FIG. 4 is a diagram illustrating an exemplary set of data structures for synchronizing frame-synchronous metadata and video frames according to some embodiments. An exemplary video track (e.g., video track 230 or video track 330) includes, for each sample 410, a location and size 415, a time offset 420, and a duration 430, where a sample corresponds to a frame in the corresponding media data (e.g., an I-frame, B-frame, P-frame). The location and size 415 identify the location of the sample in the segment data (e.g., segment data 225, segment data 325) and the size of the sample (e.g., since frames may have different sizes due to compression). For example, the location may be an address (ADX) that provides an offset to a data location within the segment data, and the size may be a value representing the size of the sample in bytes. The time offset 420 provides a time to indicate to a playback device (e.g., client electronic device 140) when the sample should be rendered within the overall media presentation. The time offset may be relative (e.g., based on other samples in the segment or group of segments) or absolute (e.g., relative to an overall timeline of the presentation). In some embodiments, the time offset is a decoding time, a composition time, or a decoding time and a composition time under the ISOBMFF. The duration 430 indicates the duration during which the frame should be rendered.

An exemplary frame-synchronous metadata track (e.g., KLV track 240, KLV track 350) includes, for each sample 435, a location and size 440, a time offset 445, and a duration 450, where a sample corresponds to a metadata value in the plurality of metadata values associated with the media presentation. The location and size 440 identify the location of the sample in the segment data (e.g., segment data 225, segment data 345) and the size of the sample (e.g., since metadata values may have different sizes). The time offset 445 provides a time to indicate to a playback device (e.g., client electronic device 140) when the sample should be rendered within the overall media presentation. The time offset may be relative (e.g., based on other samples in the segment or group of segments) or absolute (e.g., relative to an overall timeline of the presentation). In some embodiments, the time offset is a decoding time, a composition time, or a decoding time and a composition time under the ISOBMFF. The duration 450 indicates the duration during which the frame should be rendered.

To provide synchronization between metadata values and frames, the media transcoder 120 prepares timing information for the segmented media presentation such that the time during which each metadata value (or an indication thereof) is rendered is within a time during which a corresponding frame is rendered, where the correspondence between frames and metadata values is based on the timing information obtained from the media source.

In the illustrated exemplary video and metadata tracks, the time offsets 420, 445 and durations 430, 450 may be generated by the media transcoder 120 and used by the playback application 145 to preserve the synchronization between metadata values and frames from the media data source. In this example, video frames (or samples in the video track) are assumed to be in-sequence (not decoded out of order), and there is assumed to be a one-to-one correspondence between frames and metadata values. Further, time offsets are relative to the display of prior samples. The first frame ("sample 0") in the video track is displayed at time offset 0 (from the start of the segment) for a duration of 1500 (such as in the case for a 60 frames-per-second video having a timescale of 90000 ticks per second). Thus, the first frame is displayed from tick 0 to tick 1499. The second frame ("sample 1") in the video track is displayed at time offset 0 relative to the end of the display of the first frame, so from tick 1500 to tick 2999. Subsequent frames are rendered every 1500 tickets. To align a particular metadata sample with a frame based on the timing information obtained from the media data source, the transcoder 120 generates time offsets and durations for the metadata samples to align the metadata samples with the period during which a corresponding frame is rendered. In this example, the timing information in the metadata track causes the playback application 145 to render the metadata values at the beginning of the duration of each video frame (e.g., from tick 0 to tick 1 for the first metadata value, from tick 1500 to tick 1501 for the second metadata value, and so on). Thus, the time during which a frame is rendered circumscribes or encompasses the time during which the associated metadata value or metadata values are rendered. In other words, the time during which a metadata value (or indication or representation thereof) is rendered is coincident with or bounded by the time during which the corresponding frame is rendered.

Although the data structures illustrated in FIG. 4 contemplated time offsets and durations, other timing information formats may be used in other embodiments. For example, timing information may include time stamps that indicate to a playback application when a metadata value or a frame should be rendered. In embodiments where there is a one-to-one relationship between metadata values and frames, a single set of timing information can be used to synchronize both the frames and their corresponding metadata values.

In some embodiments, a master or top-level playlist identifies other playlists rather than directly identifying groups of segments as illustrated in FIGS. 2 and 3. For example, the playlist 205 may identify a first playlist that identifies the group of segments 210A-210M, a second playlist that identifies the group of segments 212A-212N, etc. As another example, the playlist 305 may identify a first playlist that identifies the group of segments 310A-310M, a second playlist that identifies the group of segments 312A-312N, etc.

In some embodiments, the headers and media data illustrated in FIGS. 2 and 3 are stored in separate files, where the playlist identifies the file including the header, and the header includes information identifying the file including the media data associated with the header.

In some embodiments, such as for live streaming, the group of segments files (e.g., 210A-210M, 310A-310M) is dynamic. That is, the media transcoder 120 receives video data from a media data source and generates one or more segment files. The playback application 145 requests the new segments as they become available. In some embodiments, the media transcoder 120 generates a playlist having an algorithmically determined location for the next segment, so a playback application 145 can request segments as they are generated by the media transcoder. In other embodiments, the media transcoder 120 updates the playlist as segments are generated and the playback application 145 obtains the updated playlist and requests newly-added segments.

Figure 5:
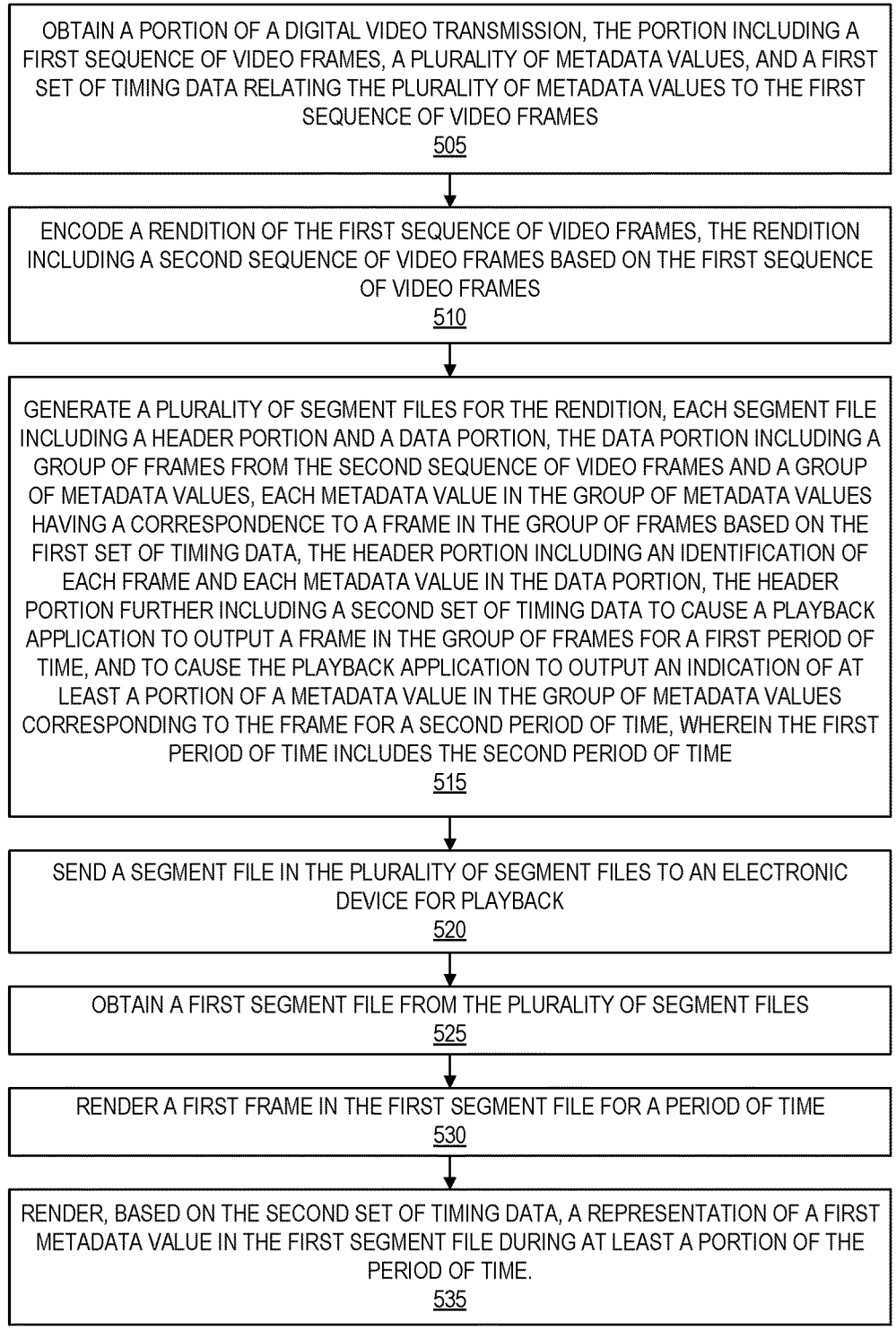
FIG. 5 is a flow diagram illustrating operations of a method for transcoding video with frame-synchronous metadata for segmented delivery and for segmented delivery according to some embodiments.

FIG. 5 is a flow diagram illustrating operations of a method for transcoding video with frame-aligned metadata for segmented delivery and for segmented delivery according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by the media transcoder 120, the web server 130, and or the client electronic device 140 of the other figures.

The operations 500 include, at block 505, obtaining a portion of a digital video transmission, the portion including a first sequence of video frames, a plurality of metadata values, and a first set of timing data relating the plurality of metadata values to the first sequence of video frames. As described elsewhere herein, the media transcoder obtains video from a media data source (e.g., media data source 105, 106) that includes frame-synchronous metadata, such as KLV metadata. The digital video includes timing information relating the frames of video to the frame-synchronous metadata, such as clock references in an MPEG-2 transport stream or the correspondence of the frame-synchronous metadata to frames based on blanking intervals.

The operations 500 include, at block 510, encoding a rendition of the first sequence of video frames, the rendition including a second sequence of video frames based on the first sequence of video frames. As described elsewhere herein, the media transcoder 120 may generate a number of different renditions of the received digital video to encode, e.g., for different screen sizes, for different transmission speeds, etc.

The operations 500 include, at block 515, generating a plurality of segment files for the rendition, each segment file including a header portion and a data portion, the data portion including a group of frames from the second sequence of video frames and a group of metadata values, each metadata value in the group of metadata values having a correspondence to a frame in the group of frames based on the first set of timing data, the header portion including an identification of each frame and each metadata value in the data portion, the header portion further including a second set of timing data to cause a playback application to output a frame in the group of frames for a first period of time, and to cause the playback application to output an indication of at least a portion of a metadata value in the group of metadata values corresponding to the frame for a second period of time, wherein the first period of time includes the second period of time. As described elsewhere herein, the media transcoder 120 divides up a rendition of a video into segments, each segment having some subset of the frames in the sequence of frames included in the video. In some embodiments, the segment files are containers that include a header portion and a data portion, the subdivided groups of frames in the video stored in the data portions, and the header portions including identifying information of the frames contained in the associated data portion. A track in the header portion identifies samples (e.g., frames of video, metadata values, a length of audio, etc.) and includes, per-sample timing information for use by a playback device to control the timing of the rendering of the samples associated with the track. To preserve the correspondence between metadata values and frames from the media data source, the timing information renders metadata values or indications or representations thereof within the time period during which the corresponding frame is rendered.

The operations 500 include, at block 520, sending a segment file in the plurality of segment files to an electronic device for playback. As described elsewhere herein, a web server (e.g., the web server 130) receives requests for segments of the media presentation. In response to such requests, the web server retrieves the requested data (e.g., a segment file) and sends the data to the requestor. The segment files may be stored in one or more data stores, such as streaming data stores 125.

The operations 500 include, at block 525, obtaining a first segment file from the plurality of segment files. As described elsewhere herein, a client electronic device (e.g., client electronic device 140), and more particularly a playback application (e.g., playback application 145) executing on the client electronic device, may issue a request (e.g., an HTTP GET) to a web server (e.g., web server 130, 606) for segments. The web server has access to the segments as generated above, e.g., via a streaming data store (e.g., streaming data store(s) 125, streaming data store 612), obtains the request segment, and sends the requested segment back to the requestor.

The operations 500 include, at block 530, rendering a first frame in the first segment file for a period of time, and, at block 535, rendering, based on the second set of timing data, a representation of a first metadata value in the first segment file during at least a portion of the period of time. As described elsewhere herein, the segment files contain sample timing information to control when data is presented to a viewer. The media transcoder 120 maintains the timing relationships that existed in the timing information contained in the source digital video in the timing information contained within the segment files so that the synchronicity between the metadata and frames is preserved. As a result, a playback application can contemporaneously render a frame and the frame-synchronous metadata value (or a representation thereof) during the same period of time. For example, the playback application can render the video while updating a map centered on geospatial information contained in the metadata such that pausing the video results in the map remaining centered on the location in the frame on which the video was paused.

Figure 6:
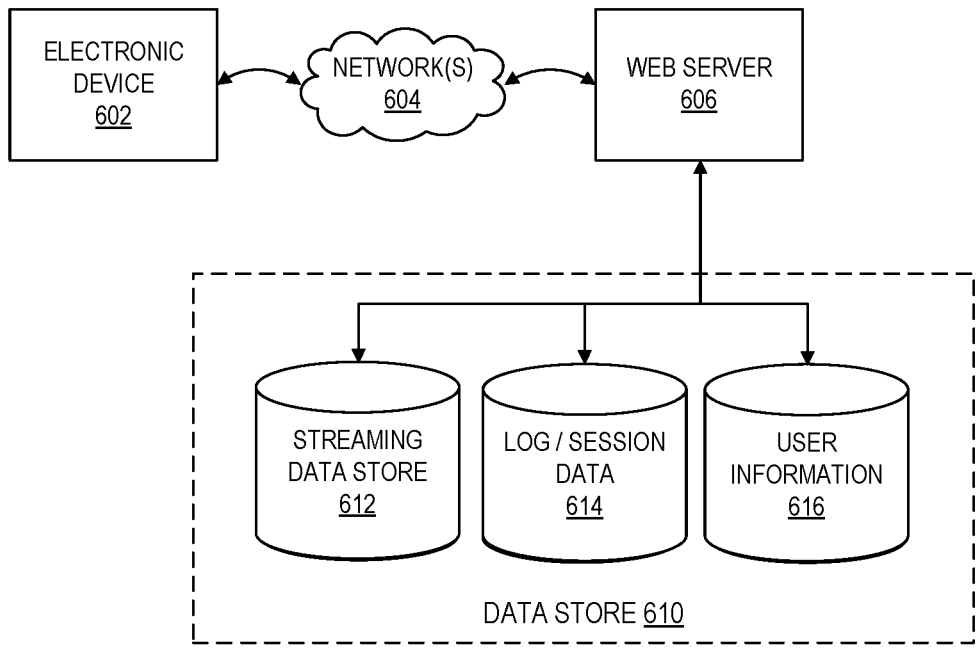
FIG. 6 illustrates an example of a client-server environment for implementing aspects of segmented delivery in accordance with various embodiments.

FIG. 6 illustrates an example of a client-server environment for implementing aspects of segmented delivery in accordance with various embodiments. For example, in some embodiments requests for segments sent by an electronic device 602 (e.g., the electronic device 140) are HyperText Transfer Protocol (HTTP) requests via network(s) 604 to a web server 606 (e.g., web server 130). As will be appreciated, although a web-based environment is used for purposes of explanation, different environments may be used, as appropriate, to implement various embodiments. The electronic device 602, which may also be referred to as a client device, can be any appropriate device operable to send and receive requests, messages or information over the network(s) 604 and convey information back to a user of the device 602. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The network(s) 604 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 604 includes the Internet, as the environment includes a web server 606 for receiving requests and serving content in response thereto, although for other networks an alternative device serving a similar purpose could be used, as would be apparent to one of ordinary skill in the art.

The illustrative environment includes a data store 610. It should be understood that there can be several application servers, layers, or other elements, processes or components, which may be chained or otherwise configured between the web server 606 and the data store 610, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The handling of all requests and responses, as well as the delivery of content between the client device 602 and the data store 610, can be handled by the web server 606. It should be understood that the web server 606 are not required and are merely example components, as structured code discussed herein can be executed on any appropriate device or host machine as discussed elsewhere herein. For example, the functions of the web server and transcoder may be implemented as software applications running on the same computer system, in some embodiments.

The data store 610 can include several separate data tables, databases, or other data storage mechanisms and media for storing data relating to media segments and, optionally, playlists. For example, the exemplary data store 610 includes mechanisms for storing streaming data store 612, such as segments and playlists, user information 616, and log or session data 614 related to media playback. The data store 610 is operable, through logic associated therewith, to receive instructions from the web server 606 and obtain, update, or otherwise process data in response thereto. In one example, an electronic device 602 might submit a request for a certain media segment to the web server 606, which in turn requests the identified segment from the data store 610. The web server 606 may first access the user information 616 to verify the identity of the viewer and that the viewer can access the requested data.

The web server 606 and/or data store 610 may be implemented by one or more electronic devices, which can also be referred to as electronic server devices or server end stations, and may or may not be located in different geographic locations. Each of the one or more electronic devices may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 6. Thus, the depiction of the environment 600 in FIG. 6 should be taken as being illustrative in nature and not limiting to the scope of the disclosure.

Figure 7:
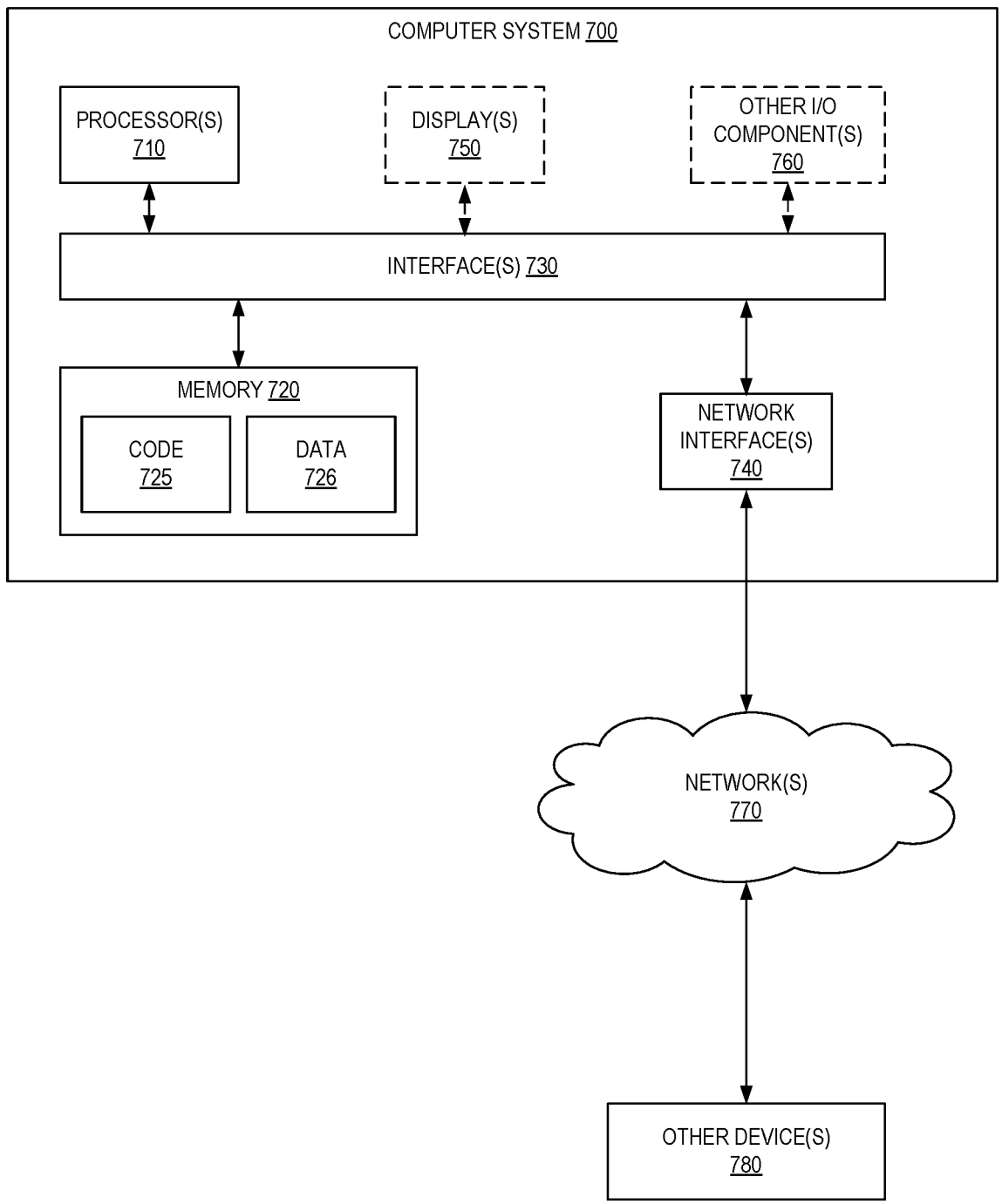
FIG. 7 is a block diagram illustrating an example computer system that may be used in some embodiments.

FIG. 7 is a block diagram illustrating an example computer system 700 that may be used in some embodiments to implement a portion or all of transcoding media, a portion or all of serving segmented media via a network, or a portion or all of requesting and receiving segmented media via a network and rendering segmented, including frame-synchronous metadata, to a viewer. Exemplary computer system 700 includes one or more processors 710 coupled to a memory 720 an interface 730. Computer system 700 further includes a network interface 740 coupled to the interface 730. Computer system 700 optionally includes one or more displays 750 and one or more other input/output (I/O) components 760. While FIG. 7 shows computer system 700 as a single computing device, in various embodiments a computer system 700 may include one computing device or any number of computing devices configured to work together as a single computer system 700.

In various embodiments, computer system 700 may be a uniprocessor system including one processor 710, or a multiprocessor system including several processors 710 (e.g., two, four, eight, or another suitable number). Processors 710 may be any suitable processors capable of executing instructions. For example, in various embodiments, processors 710 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 710 may commonly, but not necessarily, implement the same ISA.

The memory 720 may store instructions and data accessible by processor(s) 710. In various embodiments, the memory 720 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within the memory 720 as code 725 and data 726.

In one embodiment, the interface 730 may be configured to coordinate I/O traffic between processor 710, memory 720, and any peripheral devices in the device, including network interface 740 or other peripheral interfaces. In some embodiments, the interface 730 may perform any necessary protocol, timing or other data transformations to convert data signals from one component (e.g., memory 720) into a format suitable for use by another component (e.g., processor 710). In some embodiments, the interface 730 may include support for devices attached through various types of peripheral buses, such as a variant of the Peripheral Component Interconnect (PCI) bus standard or the Universal Serial Bus (USB) standard, for example. In some embodiments, the function of the interface 730 may be split into two or more separate components, such as a north bridge and a south bridge, for example. Also, in some embodiments some or all of the functionality of the interface 730, such as an interface to memory 720, may be incorporated directly into processor 710.

Network interface 740 may be configured to allow data to be exchanged between computer system 700 and other devices 780 attached to a network or networks 770, such as other computer systems or electronic devices as illustrated in the other figures, for example. In various embodiments, network interface 740 may support communication via any suitable wired or wireless general data networks, such as types of Ethernet network, for example. Additionally, network interface 740 may support communication via telecommunications/telephony networks such as analog voice networks or digital fiber communications networks, via storage area networks (SANs) such as Fibre Channel SANs, or via I/O any other suitable type of network and/or protocol.

In some embodiments, memory 720 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 700 via the interface 730. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 700 as memory 720 or another type of memory. Further, a computer-accessible medium may include transmission media or signals such as electrical, electromagnetic, or digital signals, conveyed via a communication medium such as a network and/or a wireless link, such as may be implemented via network interface 740.

The display(s) 750, such as a touch screen or liquid crystal display (LCD), convey visual information to a user, although some computer systems may not have a display 750 at all (e.g., servers). For example, the computer system 700 may display a video to a viewer on a first display 750 and the associated frame-synchronous metadata (or information derived therefrom) on a second display 750. The I/O components 760 provide facilities to the user for interacting with the computer system 700. Such I/O components 760 include, but are not limited to, speakers for rendering audio, keyboards, mice, or other input devices for receiving user inputs, microphones, cameras, other sensors, etc. for collecting data, etc.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 210A-210M, 212A-212N, etc.) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   obtaining a portion of a digital video transmission, the portion including a first sequence of video frames, a plurality of metadata values, and a first set of timing data relating the plurality of metadata values to the first sequence of video frames;
   encoding a rendition of the first sequence of video frames, the rendition including a second sequence of video frames based on the first sequence of video frames; and
   generating a second set of timing data to cause a playback application to:
      output a frame in the second sequence of video frames for a first period of time, and
      output an indication of at least a portion of a metadata value corresponding to the frame for a second period of time, wherein the first period of time includes the second period of time;
   generating a plurality of segment files for the rendition, each segment file including a header portion and a data portion, the data portion including a group of frames from the second sequence of video frames and a group of metadata values, each metadata value in the group of metadata values having a correspondence to a single frame in the group of frames, the header portion including an identification of each frame and each metadata value in the data portion, the header portion further including a subset of the second set of timing data associated with the group of metadata values; and
   sending a segment file of the plurality of segment files to an electronic device for playback.

2. The computer-implemented method of claim 1, wherein the first set of timing data includes clock reference values associated with each frame in the first sequence of video frames and each metadata value in the plurality of metadata values, and wherein the second set of timing data includes a frame duration for each frame in the second sequence of video frames and a metadata value duration for each metadata value in the plurality of metadata values, wherein each metadata value duration is less than or equal to each frame duration.

3. The computer-implemented method of claim 1, wherein each metadata value in the plurality of metadata values is comprised of a key, a value corresponding to the key, and a length of the value corresponding to the key.

4. The computer-implemented method of claim 1, further comprising converting the plurality of metadata values from a first format to a second format.

5. The computer-implemented method of claim 1, wherein the rendition has a different resolution or compression ratio than the first sequence of video frames.

6. The computer-implemented method of claim 1, further comprising modifying a portion of a metadata value in the plurality of metadata values prior to sending the plurality of metadata values to the electronic device.

7. A system comprising:
   a media transcoding and distribution service implemented by a first one or more computer systems, the media transcoding and distribution service includes instructions that upon execution cause the first one or more computer systems to:
      obtain a portion of a digital video transmission, the portion including a first sequence of video frames, a plurality of metadata values, and a first set of timing data relating the plurality of metadata values to the first sequence of video frames;
      encode a rendition of the first sequence of video frames, the rendition including a second sequence of video frames based on the first sequence of video frames; and
      generate a plurality of segment files for the rendition, each segment file including a header portion and a data portion, the data portion including a group of frames from the second sequence of video frames and a group of metadata values, each metadata value in the group of metadata values having a correspondence to a single frame in the group of frames based on the first set of timing data, the header portion including an identification of each frame and each metadata value in the data portion, the header portion further including a second set of timing data to associate each metadata value in the data portion to the single frame in the group of frames; and
   a playback application implemented by a client computer system, the playback application including instructions that upon execution cause the client computer system to:
      obtain a playlist file that identifies the plurality of segment files;
      send a request to the media transcoding and distribution service, the request including an identification of a segment file in the plurality of segment files; and
      receive the segment file from the media transcoding and distribution service;
      output a frame in the segment file for a first period of time; and
      output, based on the second set of timing data, an indication of at least a portion of a metadata value in the segment file corresponding to the frame for a second period of time, wherein the first period of time includes the second period of time.

8. The system of claim 7, wherein each metadata value in the plurality of metadata values is comprised of a key, a value corresponding to the key, and a length of the value corresponding to the key.

9. The system of claim 7, wherein the header portion of each segment file includes a sample table for the group of frames and a sample table for the group of metadata values, the sample table for the group of frames including a first portion of the second set of timing data related to the group of frames that includes a frame duration value for each frame in the group of frames, and the sample table for the group of metadata values including a second portion of the second set of timing data related to the group of metadata values that includes a metadata duration value for each metadata value in the group of metadata values, wherein a frame duration value for a first frame in the group of frames is greater than a metadata duration value for a first metadata value in the group of metadata values corresponding to the first frame.

10. The system of claim 7, wherein the media transcoding and distribution service includes instructions that upon execution further cause the first one or more computer systems to generate the playlist file.

11. The system of claim 7, wherein the media transcoding and distribution service includes instructions that upon execution further cause the first one or more computer systems to convert the plurality of metadata values from a first format to a second format.

12. The system of claim 7, wherein the rendition has a different resolution or compression ratio than the first sequence of video frames.

13. The system of claim 7, wherein the media transcoding and distribution service includes instructions that upon execution further cause the first one or more computer systems to modify a portion of a metadata value in the group of metadata values.

14. The system of claim 7, wherein the request is an HTTP request.

15. A computer-implemented method comprising:
obtaining a portion of a digital video transmission, the portion including a first sequence of video frames, a plurality of metadata values, and a first set of timing data relating the plurality of metadata values to the first sequence of video frames;
encoding a rendition of the first sequence of video frames, the rendition including a second sequence of video frames based on the first sequence of video frames; and
generating a second set of timing data to cause a playback application to:
output a frame in the second sequence of video frames for a first period of time, and
output an indication of at least a portion of a metadata value corresponding to the frame for a second period of time, wherein the first period of time includes the second period of time; and
generating a plurality of video segment files for the rendition, each segment file including a header portion and a data portion, the data portion including a group of frames from the second sequence of video frames, the header portion including an identification of each frame in the data portion; and
generating at least one frame-synchronous metadata segment file, the at least one frame-synchronous metadata segment file including a header portion and a data portion, the data portion including at least a portion of the plurality of metadata values, the header portion including an identification of each metadata value in the data portion, the header portion further including a subset of the second set of timing data associated with the portion of the plurality of metadata values,
sending a video segment file of the plurality of video segment files and the at least one frame-synchronous metadata segment file to an electronic device for playback.

16. The computer-implemented method of claim 15, further comprising generating a playlist file that identifies the plurality of video segment files and the at least one frame-synchronous metadata segment file.

17. The computer-implemented method of claim 15, wherein the first set of timing data includes clock reference values associated with each frame in the first sequence of video frames and each metadata value in the plurality of metadata values, and wherein the second set of timing data includes a frame duration for each frame in the second sequence of video frames and a metadata value duration for each metadata value in the plurality of metadata values, wherein each metadata value duration is less than or equal to each frame duration.

18. The computer-implemented method of claim 15, wherein each metadata value in the plurality of metadata values is comprised of a key, a value corresponding to the key, and a length of the value corresponding to the key.

19. The computer-implemented method of claim 15, further comprising converting the plurality of metadata values from a first format to a second format.

20. The computer-implemented method of claim 15, wherein the rendition has a different resolution or compression ratio than the first sequence of video frames.

* * * * *